Jan. 10, 1933. E. P. BUTUSOV Re. 18,709

ELEVATOR SIGNALING SYSTEM

Original Filed Oct. 16, 1919 2 Sheets-Sheet 1

INVENTOR
EMIL P. BUTUSOV
BY
Stone, Boyden, Mack & Hahn
ATTORNEYS.

Jan. 10, 1933. E. P. BUTUSOV Re. 18,709

ELEVATOR SIGNALING SYSTEM

Original Filed Oct. 16, 1919 2 Sheets-Sheet 2

INVENTOR
EMIL P. BUTUSOV
BY
Stone, Boyden, Mack & Hahn,
ATTORNEYS.

Reissued Jan. 10, 1933

Re. 18,709

UNITED STATES PATENT OFFICE

EMIL P. BUTUSOV, OF HOLLYWOOD, ILLINOIS, ASSIGNOR OF ONE-HALF TO DANIEL LEWY, OF CHICAGO, ILLINOIS

ELEVATOR-SIGNALING SYSTEM

Original No. 1,581,383, dated April 20, 1926, Serial No. 331,114, filed October 16, 1919. Application for reissue filed October 13, 1932. Serial No. 637,654.

My invention relates to signaling systems for elevator cars employing signal devices upon and individual to the different floors that are reached by an elevator car in its up and down travel.

Hitherto these signal devices have been controlled by electro-magnetic mechanism, one for each signal device.

In accordance with my present invention, I provide electro-magnetic mechanism common to the signal devices, this mechanism operating to bring a circuit controlling switch into circuit closing or other controlling relation successively with the signals and in advance of the arrival of the elevator car at the floors to which the signals are individual so that prospective passengers may have ample warning of the approach of an elevator car to his floor. This electro-magnetic mechanism may be placed at any convenient point, but preferably I place it at the midpoint of the system, in order to effect a great saving in wiring. So far as I have been able to determine, the placing of this mechanism at the mid-point of the system is entirely new.

There is also preferably provided a signal device including electro-magnetic operating mechanism common to all of the floors and having a single displaying element adapted, by being placed in successive positions or conditions that are individual to the floors, to indicate the floor levels as they are reached by the elevator car. Such a signal device may be located upon the main floor to be in the presence of an elevator car starter and, if desired, there may be a similar device upon each of the other floors, in the car or elsewhere.

My invention is also capable of use in an elevator system employing a plurality of cars traveling between the various floors of a building, the operation of such cars being directed by a starter stationed on the lower floor of the building.

I will explain my invention more fully by reference to the accompanying drawings illustrating the preferred embodiment thereof.

Figure 1:
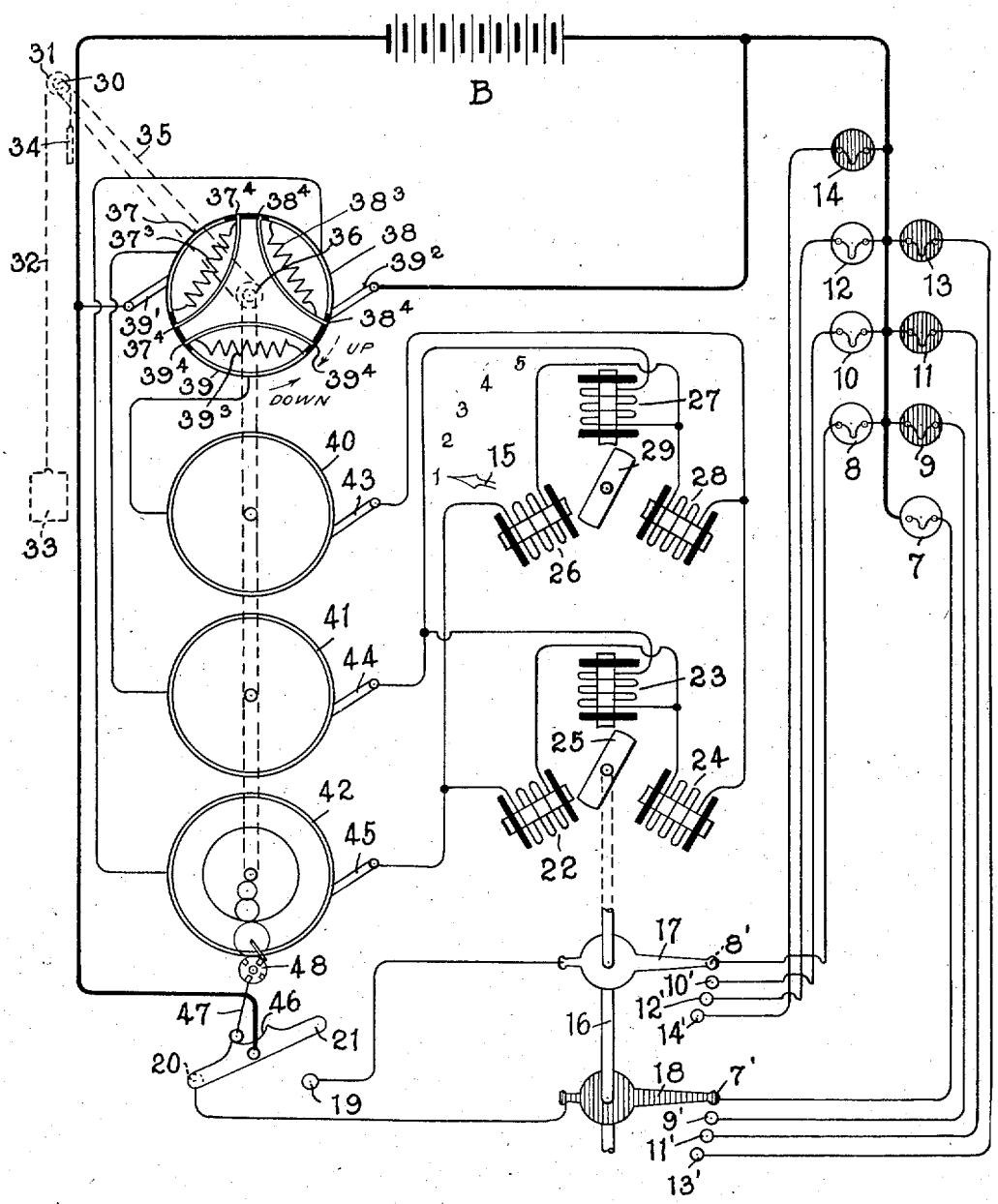
Figure 2:
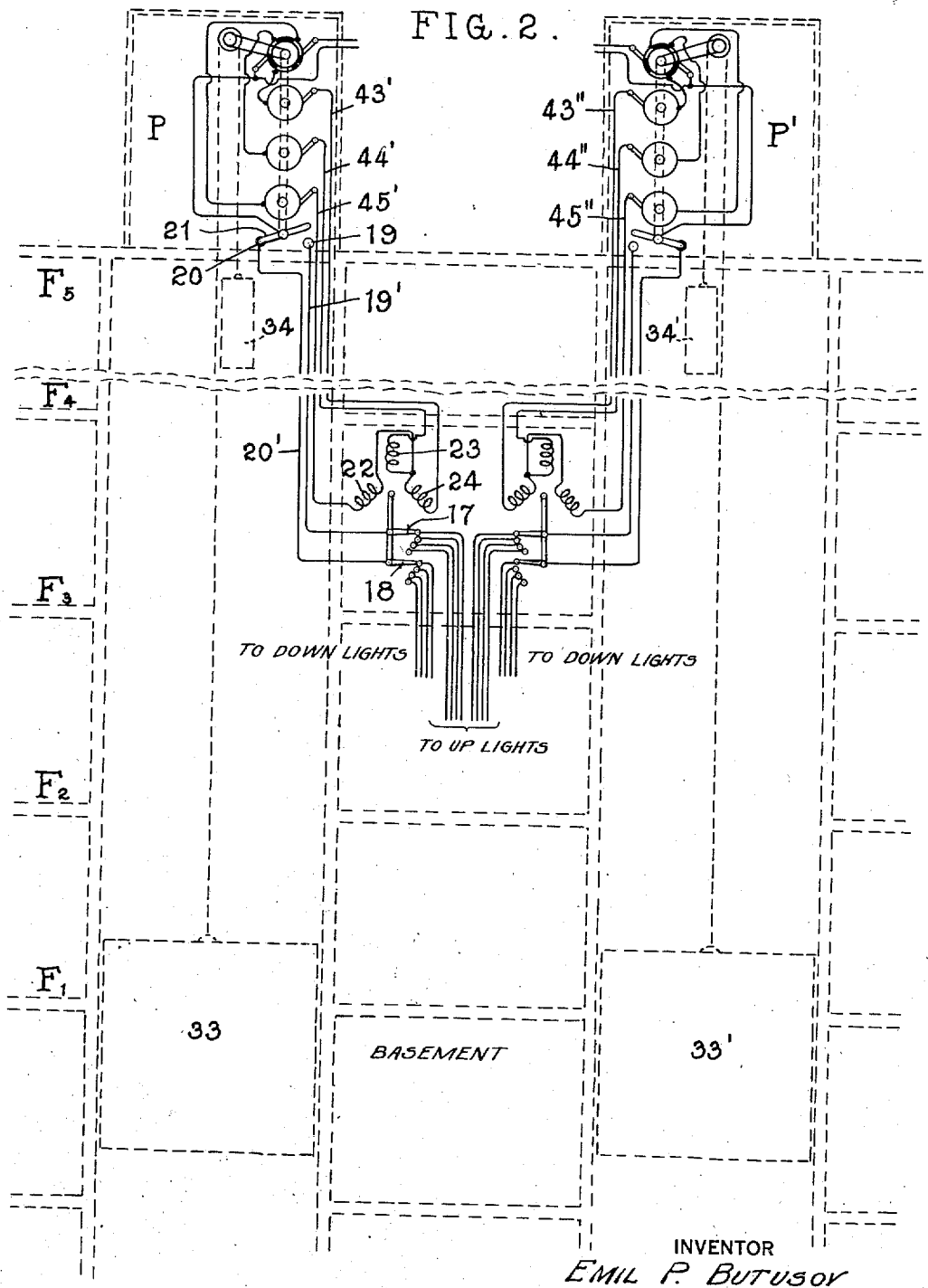

Figure 1 illustrates a wiring diagram showing the manner in which the various parts of my signaling system for a single elevator are connected electrically, and Figure 2 is a conventional sectional elevation of a store, hotel or office building having a plurality of floors and shows the preferred method of installing my system for two elevators with respect to the pent-house and one of the floors opening into the elevator hatchways.

Signal devices which are individual to the floors and are upon the floors, are illustrated at the right of Figure 1, initial signal device 7 being individual to the first floor, signal devices 8 and 9 to the second floor, signal devices 10 and 11 to the third floor, signal devices 12 and 13 to the fourth floor, and initial signal device 14 to the fifth floor. These signal devices are preferably in the form of incandescent lamps, the set of signal devices 7, 8, 10, and 12 displaying light of one color, usually white, to show the floor from which the car is shortly to ascend. The set of signal devices 9, 11, 13 and 14 display light of another color, usually red, to show the floor from which the car is shortly to descend. For example, when the car, in its descent, nearly reaches the first floor, signal 7 will light to show that the car is shortly to move upward and when the car, in its ascent, nearly reaches the top, floor signal 14 will light to show that the car is shortly to descend. The signal toward whose floor the car is moving is displayed an appreciable time before the arrival of the car at that floor.

The other signal device which is employed to indicate the arrivals of the car at floor levels is shown as including an index or pointer 15 sweeping over a dial which is marked with numerical characters or other signs corresponding or individual to the respective floor levels. It is, of course, apparent that if the signal devices 7 to 14 inclusive were not employed that the signal device having the index 15 could be employed upon the different floors. While I employ an index 15 to operate in conjunction with the signs 1, 2, 3, 4, 5, the invention is not to be limited to the particular nature of the element 15 common to the floors and arranged successively to be brought into co-relation with the signs individual to the floor.

By means of the preferred mechanisms to be later described a wiper shaft 16 is caused to turn in one direction when the elevator car is ascending and in the reverse direction when the car is descending. A wiper or contact member 17 is connected in circuit for the ascent of the elevator car and another wiper or contact member 18 is made effective for the descent of the elevator car, either wiper being out of service when the other is in service. In this way I am enabled to employ the single shaft 16 and a single motor mechanism or electro-magnetic actuated mechanism to turn the shaft 16 in one direction when the wiper 17 is effective and in the reverse direction when the wiper 18 is effective, though it is to be understood that I do not limit myself to the single shaft and the accompanying single motor.

It will be understood that both wipers move with the shaft 16 in both directions, but that the wiper 18 is effective only when moving counter-clockwise, upon the descent of the car, and the wiper 17 is effective only when moving clockwise, upon the ascent of the car. The wipers are so positioned upon the shaft with respect to each other and their waiting contacts 8′, 10′, 12′, 14′ (for wiper 17) and 7′, 9′, 11′, and 13′ (for wiper 18) that either wiper is brought to the beginning of its range of movement when the other wiper has reached the end of its range of movement. These waiting contacts constitute terminals of conductors respectively including the signal lamps through which these conductors and contacts are connected with one side of the battery B. Wiper 17 is connected with a contact button 19 and the wiper 18 is connected with a contact button 20. A master switch 21 is connected with the other side of battery B. This switch is under the control of the car or elevator system, as will appear, and is brought into engagement with the contact button 20 when the car goes down. Said switch is brought into engagement with the contact button 19 when the car goes up. The diagram of Fig. 1 indicates that the car has nearly reached its lowermost level, the circuits being adjusted to light up lamp 7 on the bottom floor to indicate that the car is near the lower end of its journey and will shortly ascend. The circuit of the lowermost up lamp 7 includes the down wiper 18 and the circuit of the uppermost down lamp 14 includes the up-wiper 17.

The means which I employ to actuate the wiper shaft 16 comprises an electro-magnetic device or motor having magnets 22, 23 and 24 and an armature 25 common to these magnets and in suitable gear connection with the shaft 16. This motor is controlled by the moving car or the elevator mechanism that operates the car to cause said armature to move in one direction or the other according to the direction of movement of the car. Another motor, which is generally similar to the aforesaid motor, is provided for governing the position of the index 15, this second motor including the magnets 26, 27 and 28 and the armature 29 common to these magnets and in suitable gear connection with the index 15.

Any suitable mechanism may be employed to enable the elevator car to govern the condition of the aforesaid motors and the master switch 21, but in Fig. 1, I have diagrammatically indicated a sheave or pulley 30 upon the same shaft with another sheave or pulley 31, the latter supporting a cable 32 upon which the elevator car 33 is suspended and the weight of which cable, in conjunction with the weight of the car, is offset by the counter-weight 34. Other elevator operating mechanism may be employed, it is understood. A sheave 36 is provided and is driven by the sheave 30 by means of a belt 35, or other motion transmitting mechanism. The sheave 36 is secured to a shaft on which is mounted a commutating device, or ring divided up into metallic segments 37, 38 and 39 successively engaging brushes 39′, $39^2$ connected with the terminals of the battery B. Three continuous metallic rings 40, 41 and 42 turn with the ring 37, 38 and 39. Brushes 43, 44 and 45 respectively engage the rings 40, 41 and 42. These rings 40, 41 and 42 are so connected with the magnets of each motor having the armatures 25 and 29 and with segments of the ring 37, 38 and 39 that two adjacent magnets of each motor are at a time energized, the unenergized magnet subsequently being energized and the magnet ahead of it, in the direction of rotation of the corresponding armature, then being deenergized, whereby armature rotation is effected. Means are desirably provided for opposing the sparking between the trailing ends of the ring segments 37, 38 and 39 and the brushes 39′, $39^2$. The means shown includes spark choking resistances $37^3$, $38^3$ and $39^3$ respectively connected each at one end with the contact segments 37, 38 and 39 and respectively individual to pairs of minor contact segments $37^4$, $37^4$; $38^4$, $38^4$; and $39^4$, $39^4$, each such resistance having its remaining terminal connected with the pair of minor contact segments to which it is individual. The brush tips are broad enough to bridge the gaps between the major and minor segments, the circuit through each major segment thus momentarily persisting through the corresponding resistance before the circuit is broken.

Any suitable mechanism may be employed for operating the master switch 21, this switch serving to bring the battery B alternatively into and out of connection with the up and down wipers 17 and 18. This switch is shown in the form of an oscillating switch having a cam cavity 46 receiving the operating end of a cam arm 47 controlled by Geneva gearing 48 operated by the elevator car in one direction or the other (this gearing having an element upon the same shaft with the sheave 36) to swing the arm 47 correspondingly and thereby cause the switch 21 to be oscillated into engagement with one or the other of the contacts 19, 20 and out of engagement with the remaining one of these contacts, the change in engagement occurring as the car changes its direction.

The mechanism is shown as about to be adjusted to effect clockwise movement of the shaft 16, to which end the magnets 22, 23 and 24 are energized in the order in which they are enumerated and in the order in which the signals 7, 8, 10, 12 and 14 are to be lighted. When the signals 14, 13, 11 and 9 are to be lighted upon downward movement of the car the wipers 17 and 18 have previously come into contact with their waiting contacts 14′, 13′, whereafter these wipers are given counter-clockwise movement upon the energization of the said magnets in reverse order to their enumeration. Prior to this counter-clockwise movement the switch 21 was in engagement with contact 19 and the up-wiper 17 was in engagement with the waiting contact 14′ to include the down signal 14 on the top floor in circuit with the battery B. Sufficiently in advance of the descent of the car to the fourth floor the switch 21 is engaged with the contact 20 and separated from the contact 19 to make the up-wiper 17 ineffective and the down-wiper 18 effective during their counter-clockwise movement. When the car is reaching its lowermost position the down-wiper 18 includes the up-signal 7 in circuit with the battery B and when the car is ascending or preparatory to its ascent the switch 21 is shifted by the Geneva gearing 48 to bring the up-wiper 17 into circuit, whereafter the shaft 16 moves clockwise successively to display the signals 8, 10 and 12, by including them in circuit with the battery B, as the car ascends. The shifting of the switch 21, when making the up-wiper 17 effective, during its clockwise movement, makes the down-wiper 18 ineffective.

The circuits which are successively established through the magnets 22, 23 and 24, and the magnets 26, 27 and 28 respectively in parallel with the aforesaid magnets, will be apparent to those skilled in the art.

Assuming that the ring 37, 38 and 39 is turning counter-clockwise the circuits will be established as follows: When the brush 39′ is engaged by the segment 37, circuit is established which is traceable from the battery B, through the brush 39′, the segment 37, the contact ring 41, the brush 44, the magnets 23 and 22 in series, the magnets 27, and 26 in series, these latter two magnets being together in parallel with the magnets 23 and 22, the brush 45, the ring 42, the contact segment 38, the brush $39^2$, to the battery B. At this time circuit through the magnets 24 and 28 is open at the segment 39. When the brush 39′ is engaged by the segment 38, circuit is established which is traceable from the battery B, through the brush 39′, the segment 38, the contact ring 42, the brush 45, the magnets 22 and 24 in series, the magnets 26 and 28 in series, these latter two magnets being together in parallel with the magnets 22 and 24, the brush 43, the ring 40, the contact segment 39, the brush $39^2$, to the battery B. At this time circuit through magnets 23 and 27 is open at the segment 37. When the brush 39′ is engaged by the segment 39, circuit is established which is traceable from the battery B, through the brush 39′, the segment 39, the contact ring 40, the brush 43, the magnets 24 and 23 in series, the magnets 28 and 27 in series, these latter two magnets being together in parallel with the magnets 24 and 23, the brush 44, the ring 41, the contact segment 37, the brush $39^2$, to the battery B. At this time circuit through magnets 22 and 26 is open at the segment 38. The shaft 16 will thus turn counter-clockwise in synchronism with the commutator. If the ring 37, 38 and 39 is turning clockwise it will be apparent that the shaft 16 will be turning clockwise also.

The system of my invention enables the location of the electro-magnetic mechanism above described and pertaining to the signal lamps upon the different floors at a midpoint of the hatchway, thereby greatly simplifying the wiring and reducing the expense thereof. Regardless of the number of floors in the building, there will be but one electromagnetic switching or circuit selecting mechanism for each elevator in service and by placing this on a floor midway of the hatchway, it will be obvious that a great saving in wiring is accomplished. Since there are but three coils or magnets, 22, 23 and 24, three wires only will be necessary in wiring from the car-operated commutator to the electromagnetic mechanism or motor. I prefer to call this a central relay system since all of the signals are operated from one point midway of the hatchway.

Referring to Figure 2, $F_1$, $F_2$, $F_3$, $F_4$ and $F_5$ represent the various floors in a five story building to be served by the cars 33 and 33′. The car-operated switch 21 and the commutator rings for each car are mounted in the pent-house P at the top of the hatchway. The electromagnetic switching mechanism for each car is situated on the third floor ($F_3$) midway of the hatchways. The wires 43′, 44′ and 45′ are dropped down the hatchway of one car to its motor, and wires 43″, 44″ and 45″ are dropped down the hatchway of the other car to its motor, and are connected to the respective commutators in the pent-house, both motors and associated wiper arms being located at a centralized point on the third floor.

Since there are but three coils 22, 23 and 24, no matter how tall the building may be, there will be but three feeding wires running for one half of the length of the hatchway. Two more wires 19′ and 20′ will run from the master switch 21 to the wipers 17 and 18. In prior installations, all of the wires for each elevator system run either from the well to the topmost floor or from the penthouse to the lower-most floor. In my improved system, the longest of the signal wires will extend for only one half the height of the building, namely from the upper or lower floor to the electro-magnetic selector mechanism located on an intermediate floor, midway of the height of the building, and it is obvious that the total amount of wire necessary for such an installation will be very much less than that required under the old practice. In fact, the saving in wiring is of the order of 50%. This system not only saves a great amount of wiring, but what wiring there is is relatively simple. Also, by placing the electromagnetically actuated circuit selecting mechanism of both cars at a centralized point, a maintenance man can go to that one place and tell at a glance just how the system is operating. It will be unnecessary for him to carry out his work from floor to floor.

While, as above pointed out, a great advantage is obtained by locating the electromagnetic mechanism at a point midway of the system, it may, in some cases, be desirable to locate such mechanism at some other centralized point.

While I have herein shown and particularly described the preferred embodiment of my invention, I do not wish to be limited to the precise details of construction shown as changes may readily be made without departing from the spirit of my invention, but having thus described my invention I claim as new and desire to secure by Letters Patent the following:—

1. An elevator signaling system for an elevator system including a hatchway and a car operating between a plurality of floors, a signal at each floor, a circuit for each signal extending to substantially the mid-point of said hatchway, means mounted at substantially the mid-point of said hatchway for selecting any one of said circuits, electromagnetic means for operating said selecting means, and means mechanically operated by and in accordance with the movement of said car in said hatchway for operating said electromagnetic means to select the signal corresponding to the position of said car in said hatchway.

2. An elevator signaling system for an elevator system including a hatchway and a car operating between a plurality of floors, a signal at each floor, a circuit for each signal extending to substantially the mid-point of said hatchway, a single switching mechanism having contacts individual to the circuits of said signals and a contact member complemental to these contacts, said switching mechanism being mounted at substantially the mid-point of said hatchway for selecting any one of said circuits, electromagnetic means for operating said switching mechanism, and means mechanically operated by and in accordance with the movement of said car in said hatchway for operating said electromagnetic means to select the signal corresponding to the position of said car in said hatchway.

3. An elevator signaling system for an elevator system including a hatchway and a car operating between a plurality of floors, an up-signal and a down-signal at each floor, a circuit for each signal extending to substantially the mid-point of said hatchway, a single switching mechanism having contacts individual to the circuits of said up-signals and said down-signals and including a pair of contact members complemental to these contacts, said switching mechanism being mounted at substantially the mid-point of said hatchway for selecting any one of said circuits, electromagnetic means for operating said switching mechanism, means mechanically operated by and in accordance with the movement of said car in said hatchway for operating said electromagnetic means to select the signal corresponding to the position of said car in said hatchway, and mechanism operable by the elevator system and serving to alternately cause effective operation of but one of said contact members at a time.

4. An elevator signaling system for an elevator system including a hatchway and a car operating between a plurality of floors, an up-signal and a down-signal at each floor, a circuit for each signal extending to substantially the mid-point of said hatchway, a single switching mechanism having contacts individual to the circuits of said up-signals and said down-signals and including a pair of contact members complemental to these contacts, said switching mechanism being mounted at substantially the mid-point of said hatchway for selecting any one of said circuits, electromagnetic means for operating said switching mechanism, means mechanically operated by and in accordance with the movement of said car in said hatchway for operating said electromagnetic means to select the signal corresponding to the position of said car in said hatchway, and a master switch operable by the elevator system and serving to alternately cause effective operation of but one of said contact members at a time.

5. An elevator signaling system for an elevator system including a hatchway and a car operating between a plurality of floors, an up-signal and a down-signal at each floor, a circuit for each signal extending to substantially the mid-point of said hatchway, contacts in the signaling circuits, a contact structure complemental to said contacts and mounted at substantially the mid-point of said hatchway, electromagnetic mechanism for operating said contact structure, means mechanically operated by and in accordance with the movement of said car in said hatchway for operating said electromagnetic mechanism, and mechanism operable by the elevator system and serving alternately to establish cooperative relation between the contact structure and the up-signals and the contact structure and the down-signals.

6. An elevator signaling system for an elevator system including a hatchway and a car operating between a plurality of floors; a commutating device comprising a ring of at least three segments and brushes bearing upon said ring; mechanism whereby said ring is turned by the elevator system; conducting rings connected with and respectively individual to said ring segments; brushes upon said rings; magnets respectively individual to said brushes and included in circuit therewith and successively in circuit with said ring segments; a member having a wiper thereon, said magnets constituting a motor that is in driving relation to said member; signal devices individual to the floors served by the elevator system and included in circuits extending to substantially the mid-point of said hatchway and having contacts individual to said signal devices and a circuit portion common to the circuits of the signal devices and terminating in said wiper; the contacts respectively individual to said signal devices being successively engaged by said wiper.

7. An elevator signaling system for an elevator system including a hatchway and a car operating between a plurality of floors, a plurality of signals to be actuated in accordance with the movements of said car in said hatchway, a circuit for each signal, means for selecting any one of said circuits, a single electromagnetic device for operating said selecting means, and means mechanically operated by and in accordance with the movement of said car in said hatchway for operating said electromagnetic device to select the signal corresponding to the position of said car in said hatchway.

8. An elevator signaling system for an elevator system including a plurality of hatchways and a car in each of said hatchways operating between a plurality of floors, a plurality of signals to be actuated in accordance with the movements of said cars in said hatchways, a circuit for each signal extending to a centralized point in said system, means for selecting any one of said circuits, electromagnetic means for operating said selecting means, and means mechanically operated by and in accordance with the movements of said cars in said hatchways for operating said electromagnetic means to select the signals corresponding to the position of said cars in said hatchways.

9. An elevator signaling system for an elevator system including a plurality of hatchways and a car in each of said hatchways operating between a plurality of floors, a plurality of sets of signals to be actuated in accordance with the movements of said cars in said hatchways, a circuit for each signal of each set extending to a common centralized point in said system, means located at said centralized point for selecting any one of said circuits, a plurality of electromagnetic means, one for each car, for operating said selecting means, and means mechanically actuated by and in accordance with the movements of each of said cars in said hatchways for operating the respective electromagnetic means to select the signals corresponding to the positions of said cars in said hatchways.

10. An elevator signaling system for an elevator system including a hatchway and a car operating between a plurality of floors, a plurality of signals to be actuated in accordance with the movements of said car in said hatchway, said signals being located adjacent the different floors, a circuit for each signal, means located wholly at one point only for selecting any one of said circuits, electromagnetic means for operating said selecting means, and means mechanically operated by and in accordance with the movement of said car in said hatchway for operating said electromagnetic means to select the signal corresponding to the position of said car in said hatchway.

11. An elevator signaling system for an elevator system including a hatchway and a car operating between a plurality of floors, a plurality of signals to be actuated in accordance with the movements of said car in said hatchway, a circuit for each signal, means for selecting any one of said circuits, a rotary electromagnetic motor for driving said selecting means, and means including circuit connections and a commutator device mechanically operated by and in accordance with the movement of said car in said hatchway for supplying current to said motor in such manner as to cause it to rotate in synchronism with said commutator device to select the signal corresponding to the position of said car in said hatchway.

12. An elevator signaling system for an elevator system including a hatchway and a car operating between a plurality of floors, a plurality of signals to be actuated in accordance with the movements of said car in said hatchway, a circuit for each signal, means for selecting any one of said circuits, a rotary electromagnetic motor having a plurality of driving windings for operating said selecting means, and means including circuit connections and a commutator device mechanically operated by and in accordance with the movement of said car in said hatchway for selectively energizing said windings in succession to cause said motor to rotate and thus select the signal corresponding to the position of said cars in said hatchways.

In witness whereof, I hereunto subscribe my name this 11th day of October A. D., 1932.

EMIL P. BUTUSOV.